United States Patent [19]
Delp et al.

[11] Patent Number: 6,028,843
[45] Date of Patent: *Feb. 22, 2000

[54] EARLIEST DEADLINE FIRST COMMUNICATIONS CELL SCHEDULER AND SCHEDULING METHOD FOR TRANSMITTING EARLIEST DEADLINE CELLS FIRST

[75] Inventors: Gary Scott Delp, Rochester, Minn.; Victor Firoiu, Amherst, Mass.; Roch A. Guerin, Yorktown Heights, N.Y.; Philip Lynn Leichty; David Richard Poulter, both of Rochester, Minn.; Vinod Gerard John Peris, Croton-on-Hudson; Rajendran Rajan, North Tarrytown, both of N.Y.; John Handley Shaffer, Rochester, Minn.

[73] Assignee: International Business Machines Corporation, Armonk, N.Y.

[*] Notice: This patent is subject to a terminal disclaimer.

[21] Appl. No.: 08/823,155

[22] Filed: Mar. 25, 1997

[51] Int. Cl.$^7$ .......................... G06F 11/00; H04L 12/28; H04J 3/16

[52] U.S. Cl. .......................... 370/235; 370/395; 370/468

[58] Field of Search .................. 370/233, 395, 370/396, 401, 466, 468, 471, 474, 235

[56] References Cited

U.S. PATENT DOCUMENTS

| | | | |
|---|---|---|---|
| 4,839,831 | 6/1989 | Imajo et al. | 364/550 |
| 5,359,592 | 10/1994 | Corbalis et al. | |

(List continued on next page.)

FOREIGN PATENT DOCUMENTS

| | | |
|---|---|---|
| 0710046A2 | 5/1996 | European Pat. Off. |
| 0782303A2 | 7/1997 | European Pat. Off. |

(List continued on next page.)

OTHER PUBLICATIONS

United Kingdon Search Report under Section 17(6), Feb. 19, 1999, for corresponding Application No. GB 9804618.8.
United Kingdom Search Report under Section 17, Aug. 21, 1998, for corresponding Application No. GB 9804618.8.
"A Self–Clocked Fair Queueing Scheme for Braodband Applications" by S. Jamaloddin Golestani, Proceding IEEE Infocom v2, 1994, IEEE, Piscataway, N.J., 94CH3401–7.
"ATM Forum Technical Committee Traffic Management Specification", Version 4.0 (af–tm–0056.000) Apr., 1996.

(List continued on next page.)

Primary Examiner—Hassan Kizou
Assistant Examiner—Afsar M. Qureshi
Attorney, Agent, or Firm—Joan Pennington

[57] ABSTRACT

A method and apparatus are provided for scheduling the transmission of cells of a plurality of data streams in a communications network. An earliest deadline first (EDF) scheduler is provided for scheduling the transmission of cells of a plurality of data streams in a communications network to ensure that the connection or data stream with the earliest deadline is transmitted first. Each of the multiple data streams has a delay bound or deadline. Data of each data stream is enqueued to a corresponding data cell queue. A timing wheel time slot based on an identified target transmission time for each data cell queue is calculated utilizing an addition of a maximum delay value. A move forward timing mechanism includes a scan forward feature to identify a succession of virtual connection or data stream cell queues for transmission. A multiple tier cell scheduler is provided that includes at least two scheduling timing wheels. The priority of a first timing wheel is higher than the priority of a second timing wheel. The priority of the second timing wheel is higher than the priority of an optional third timing wheel. The third timing wheel includes a best effort operational mode. The relative rates between data streams are maintained, while the absolute rates of the data streams are increased or decreased in the lowest priority wheel.

26 Claims, 11 Drawing Sheets

U.S. PATENT DOCUMENTS

| | | |
|---|---|---|
| 5,381,407 | 1/1995 | Chao . |
| 5,463,620 | 10/1995 | Sriram ........................................ 370/468 |
| 5,533,020 | 7/1996 | Byrn et al. . |
| 5,533,021 | 7/1996 | Branstad et al. . |
| 5,535,201 | 7/1996 | Zheng ........................................ 370/231 |
| 5,537,408 | 7/1996 | Branstad et al. . |
| 5,604,742 | 2/1997 | Colmant et al. .......................... 370/468 |
| 5,627,970 | 5/1997 | Keshav ...................................... 370/232 |
| 5,631,908 | 5/1997 | Saxe .......................................... 370/235 |
| 5,633,870 | 5/1997 | Gaytan et al. ............................ 370/235 |
| 5,640,563 | 6/1997 | Carmon .................................... 709/102 |
| 5,751,709 | 5/1998 | Rathnavelu ............................... 370/395 |
| 5,844,890 | 12/1998 | Delp et al. ................................ 370/230 |

FOREIGN PATENT DOCUMENTS

| | | |
|---|---|---|
| 0817436A2 | 1/1998 | European Pat. Off. . |
| 05274162 | 10/1993 | Japan ................................ G06F 9/46 |
| WO 97/22195 | 6/1997 | WIPO . |
| WO 98/06203 | 2/1998 | WIPO . |

OTHER PUBLICATIONS

"Resource ReSerVation Protocol (RSVP)" Version 1, Internet Draft Document, "Functional Specification of the Internet Engineering Task Force (IETF)", Dated Mar. 18, 1996.

Zheng, Qin et al, "On the Ability of Establishing Real–Time Channels in Point–to–Point Packet–Switched Networks," IEEE Transactions on Communications, vol. 42, No. 2/3/4, Feb./Mar./Apr. 1994, pp. 1096–1105.

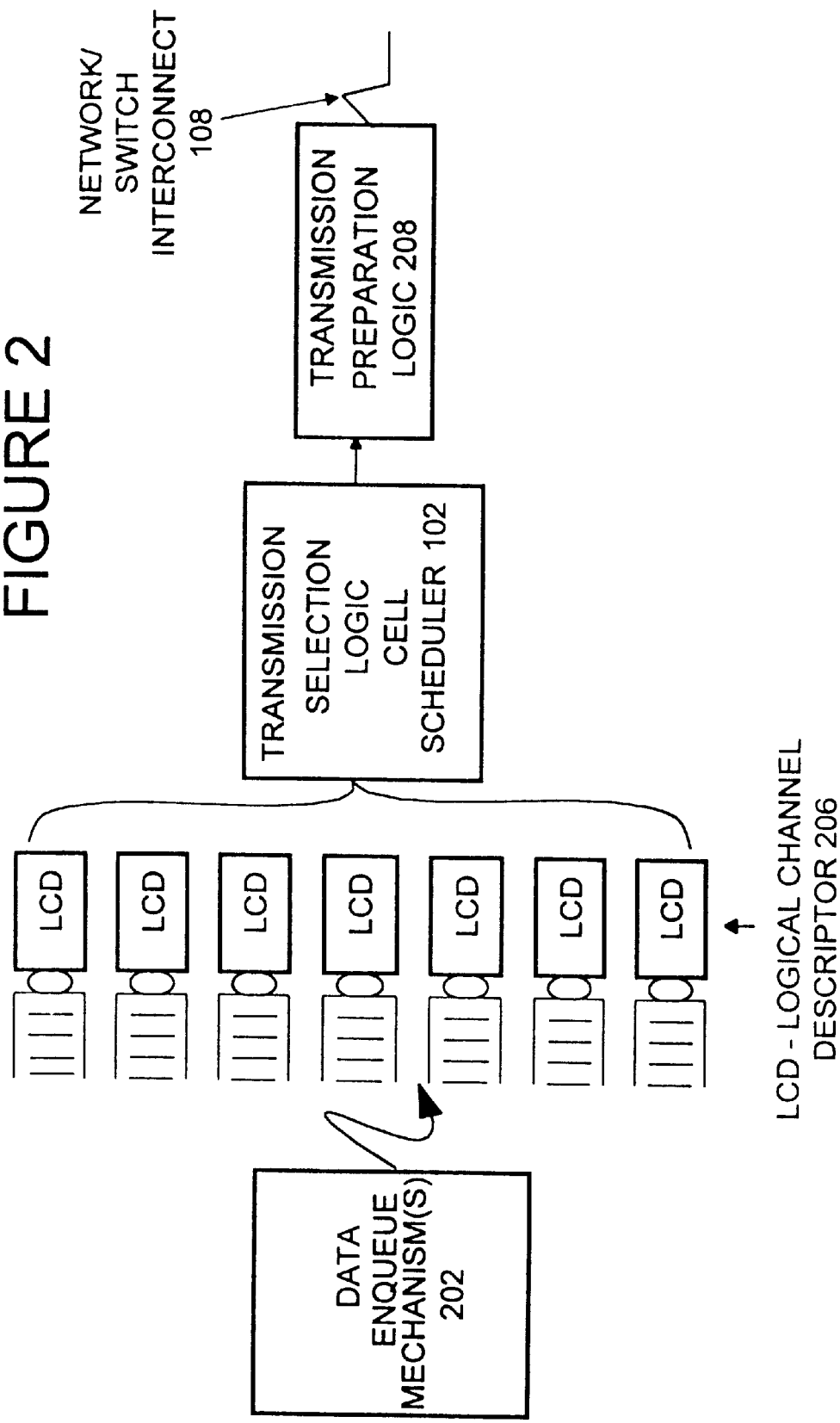

FIGURE 2A
LOGICAL CHANNEL DESCRIPTOR (LCD) 206

NEXT LCD POINTER 209
HEAD OF CELL/PACKET QUEUE 210
TAIL OF CELL/PACKET QUEUE 212
SCHEDULING PARAMETERS 214
SCHEDULING STATE 216
TIMING WHEEL SELECTOR 218

FIGURE 2B
SCHEDULING RATE PARAMETERS 220

PEAK TRANSMISSION RATE 222

SUSTAINABLE TRANSMISSION RATE 224

PEAK BURST LENGTH 226

CBR/VBR TRAFFIC TYPE 228

MAX DELAY 230

CELL SCHEDULER 102
DATA STRUCTURES INCLUDING TIMING WHEEL

FAST AND SLOW TIMING WHEELS

CALCULATE NEW TIMESTAMP=MAX
(OLD TIME STAMP + SUSTAINED INTERVAL,
CURRENT TIME - BURST LIMIT)
720

CALCULATE NEXT TIME SLOT=MAX
(TIMESTAMP + SUSTAINED INTERVAL,
CURRENT TIME + PEAK DELAY) + MAX DELAY
722

FIGURE 9

THREE TIER
CELL SCHEDULER 102

LEAKY BUCKET TIMING
WHEEL
HIGHEST PRIORITY
902

EARLIEST DEADLINE
FIRST TIMING WHEEL
MIDDLE PRIORITY
904

BEST EFFORT
TIMING WHEEL
LOWEST PRIORITY
906

EARLIEST DEADLINE FIRST COMMUNICATIONS CELL SCHEDULER AND SCHEDULING METHOD FOR TRANSMITTING EARLIEST DEADLINE CELLS FIRST

RELATED APPLICATION

1. Field of the Invention

The invention relates to the scheduling of multiple data streams through a data communications network, and more particularly, to the choice of which cell or packet should be transmitted or passed on from a network element when there are multiple potential streams with data that could be transmitted or passed on. Further the invention describes a method for classifying connections by their reserved data rate and delay bounds. This delay bound is also referred to as a deadline.

A related patent application is copending Ser. No. 08/823,865, filed on the same date as the present application, entitled: COMMUNICATIONS CELL SCHEDULER AND SCHEDULING METHOD FOR PROVIDING PROPORTIONAL USE OF NETWORK BANDWIDTH, by Gary S. Delp et al., and assigned to the present assignee.

2. Description of the Prior Art

Multimedia communications involve the blending together of computer data processing, audio/video, and display technology in an interactive environment. Evolving multimedia applications such as desktop computer conferencing and video-on-demand bring with them the need for network access to shared or common real-time data.

A Motion Pictures Experts Group MPEG-2 standard for multimedia stream transport is described in "MPEG-2" International Organization for Standardization; Organization Internationale De Normalisation (ISO/IEC ITC1/SC29/WG11) Coding of Moving Pictures and Associated Audio. The MPEG-2 standard has defined a system layer that integrates multiple media sources into a single data stream with integrated time stamps or program clock references (PCRs). The MPEG-2 standard has defined a fixed and variable rate encoding scheme for video streams that allows for variable size and quality of video streams. The MPEG-2 standard has defined a transport mechanism for other video encoding schemes, for example, MPEG-1. The MPEG-2 multimedia stream is transported over a digital network which uses the ITU standards commonly referred to as Asynchronous Transfer Mode (ATM). The Asynchronous Transfer Mode (ATM) network described in "Asynchronous Transfer Mode: Solution for Broadband ISDN", M de Prycker, Ellis Horwood, 1991 is an internationally agreed upon technique for transmission, multiplexing and switching in a broadband network. It uses fixed size cells as a unit of transmission.

ATM networks are designed to support the integration of high quality voice, video, and high speed data traffic. To the end-user, it promises to provide the ability to transport connection-oriented and connectionless traffic at constant or variable bit rates. It allows for allocation of bandwidth on demand and intends to provide negotiated Quality-of-Service (QoS). To a network provider, it enables the transport of different traffic types through the same network. In order for a network to meet QoS requirements as set by the user for a session, the network must have sufficient information about the traffic characteristics of the session. This may be approximated by (but not limited to) three basic parameters: 1) average transmission rate, 2) peak transmission rate, and 3) the interval over which the data may be transmitted at peak rate. As a part of the QoS contract with the network, all sessions must abide by the traffic parameters and not violate these parameters in order for the network to guarantee QoS to all the users. This gives rise to a complex scheduling problem when many sessions are established over a network link, which requires that each session's contract with the network not be violated. At the same time, all sessions must get the desired capacity from the network. This problem is fairly complex particularly when it involves a large number of sessions with a wide range of traffic descriptors. The problem is further compounded with the fact that different sessions require different QoS. Therefore, in case of contention, where a multiplicity of sessions have data to be transmitted and their individual contracts with the network will allow them to transmit, sessions requiring stricter QoS guarantee typically are given priority over other sessions.

In ATM networks, one known algorithm called the leaky bucket algorithm has been used to determine when a cell for a single session may be transmitted. This leaky bucket algorithm may be used to determine if a cell is allowed to be transmitted for any single session at a given time. Scheduling a multiplicity of sessions can be provided by running the leaky bucket algorithm at any time t for all the sessions to determine which sessions may be scheduled for transmission at that time. Then, cells from these sessions may be scheduled based on their assigned priorities. The leaky bucket algorithm is described in ATM Forum Technical Committee Traffic Management Specification, Version 4.0 (af-tm-0056.000) April, 1996.

An Internet Draft document, entitled Resource ReSerVation Protocol (RSVP)" Version 1 Functional Specification of the Internet Engineering Task Force (IETF) dated Mar. 18, 1996 describes a version 1 of RSVP, a resource reservation setup protocol designed for an integrated services Internet. RSVP provides receiver-initiated setup of resource reservations for multicast or unicast data flows, with good scaling and robustness properties. A scheduling algorithm implementation advantageously should be compatible with the RSVP protocol.

Guaranteeing that a flow is served in a manner consistent with its traffic contract or traffic contract rate guarantee can be quite different from guaranteeing also that this flow is served with specific delay guarantees, provided it complies with its traffic contract rate guarantee. Examples that illustrate this difference follow.

Assume two connections with both a token bucket size of 5 cells and a peak rate equal to the link speed where cells can be sent every slot if tokens are available. Connection 1 has an average token generation rate of once every 5 slots, while connection 2 has an average token generation rate of once every 10 slots. Enforcement of this traffic contract can be achieved by putting the flows on a timing wheel utilizing leaky bucket rate connection parameters. Assume also that connection 1 has a delay requirement of 3 slots, while connection 2 has a delay requirement of 6 slots. This means that connection 1 wants to be guaranteed that its cells will be transmitted on the link within at most 3 slots from the time they become eligible, while connection 2 wants to be guaranteed that its cells will be transmitted on the link within at most 6 slots from the time they become eligible.

In the examples below, time slots are numbered from 1 and up with higher numbers representing later times. For example, because connection 1 has a delay requirement of 3 slots, if a cell from connection 1 becomes eligible at time slot 6 or is ready to be transmitted at slot 6, the cell should have been transmitted on the link by slot 9 at the latest or at most 3 slots after slot 6.

Assume first that both connections 1 and 2 have the following arrival patterns starting at slot 1:

connection 1: 3,2,1,0,0,0,0,1,0,0,0,0,1,0, . . .
connection 2: 3,2,1,0,0,0,0,0,0,0,0,0,1,0, . . .

Cell eligibility times out of the leaky buckets for each connection follows, where it is assumed that each connection starts with a full token bucket, a token was just generated at time 0, and * denote a token generation time:

*          *

- connection 1: 1, 1, 1, 1, 1, 1, 1, 0, 0, 0, 1, 0 . . . (1 every 5)

*

- connection 2: 1, 1, 1, 1, 1, 0, 0, 0, 0, 1, 0, . . . (1 every 10)

Note also that the above sequence was determined assuming each cell could be transmitted at the time it becomes eligible, or in case a cell cannot be transmitted at the time it becomes eligible that the eligibility time of the next cell is computed based on the time the previous one should have left and not the time it actually left. This is a peak rate enforcement issue, and does not affect the issue of providing delay guarantees.

The actual transmission times of cells based on the above sequences of eligibility times depend on how the scheduling of cells is handled.

Let us first assume that both connections are put on the same timing wheel. This essentially amounts to considering them equal from a delay point of view. The sequence of cell transmissions is then as follows:

1,2,1,2,1,2,1,2,1,2,1,1,2,_,1,_, . . .

where the number in the above sequence indicate connection 1 or connection 2 to which the transmitted cell belongs, and _ corresponds to no cell transmissions. From the above example, it can be seen that some of the cells of connection 1 are not transmitted within the desired delay requirement of 3 slots. Specifically, the sequences of eligibility versus transmission times for cells from connections 1 and 2 are as follows:

Connection 1:
eligibility times: 1,2,3,4,5,6,10, . . .
transmission times: 1,3,5,7,9,11,12, . . .

Connection 2:
eligibility times: 1,2,3,4,5,10, . . .
transmission times: 2,4,6,8,10,13, . . .

As can be seen from the above sequences, the cells from connection 1 that are eligible at times 5 and 6 and get transmitted at times 9 and 11 which violates the deadline of 3 slots. However, none of the cells from connection 2 violate their deadline of 6 slots. In the above example, the best possible scenario is used where cells from connection 1 were always scheduled before cells from connection 2 in those cases where they were enqueued on the same transmission slot, i.e., things could have been worse.

One possible approach to try to distinguish between connections 1 and 2 is to use static priorities to allow cells from connection 1 to be transmitted ahead of cells from connection 2. For example, cells from connection 1 are placed on a high priority timing wheel and cells from connection 2 are placed on a low priority timing wheel. However, while this clearly improves performance for connection 1; it can be seen from the following that this static priority approach only reverses the problem, now cells from connection 2 miss their deadline. This can be seen by constructing the sequence of cell transmissions for this static priority approach as follows:

1,1,1,1,1,1,2,2,2,1,2,2,2,_, . . .

So, the sequences of eligibility versus transmission times for cells from connections 1 and 2 are as follows:

Connection 1:
eligibility times: 1,2,3,4,5,6,10, . . .
transmission times: 1,2,3,4,5,6,10, . . .

Connection 2:
eligibility times: 1,2,3,4,5,10, . . .
transmission times: 7,8,9,11,12,13, . . .

The above example shows that while all the cells from connection 1 are transmitted within their deadline, the cells from connection 2 that were eligible at time 4 and 5 missed their deadline since they were only transmitted at times 11 and 12, respectively. The above example is illustrative of the inherent problem of static priorities as they do not allow to account for the fact that as a cell waits, its priority should be increased to make sure it is transmitted by a given time. This requires some form of dynamic priorities; however, that is not readily supported by the static assignment of different priorities to different timing wheels.

One example of a dynamic priority scheme that would have enabled meeting the deadlines of all the above cells, is the earliest deadline first (EDF) policy, also called the earliest due date (EDD) policy. This EDF policy sends out cells in the order of their deadlines which correspond to the latest times the cells can be transmitted. In the context of the above example, this corresponds to:

Connection 1:
eligibility times: 1,2,3,4,5,6,10, . . .
deadlines: 4,5,6,7,8,9,13, . . .

Connection 2:
eligibility times: 1,2,3,4,5,10, . . .
deadlines: 7,8,9,10,11,16, . . .

The EDF policy would then have selected the following transmission order:

Connection: 1,1,1,1,2,1,2,1,2,2, 2,1,2
deadlines: 4,5,6,7,7,8,8,9,9,10,11,13,16
transmission time: 1,2,3,4,5,6,7,8,9,10,11,12,13

As can be seen, the EDF policy successfully selected transmission times for the two connections, so that all their cells were transmitted within their deadline. Note this was done based on the eligibility times of cell and not their arrival time. This is important to note as the ability to guarantee deadlines is certainly dependent on assumptions on the amount of traffic that each connection generates, i.e., a traffic contract. However, while we have assumed in the above example that the traffic of connections 1 and 2 was actually reshaped to conform to its traffic contract before cells could be considered for transmissions, we will see next that this is not a requirement. In particular, it suffices that reshaping or enforcement of the traffic contract be logical instead of physical.

A need exists for an improved method and apparatus for scheduling the transmission of cells in a communications network.

SUMMARY OF THE INVENTION

Important objects of the present invention are to provide an improved method and apparatus for scheduling the transmission of cells in a communications network; to provide an improved earliest deadline first (EDF) scheduler; to provide a method for classifying virtual connections by their reserved data rate and delay bounds; and to provide such method and apparatus that overcome disadvantages of prior art arrangements.

In brief, a method and apparatus are provided for scheduling the transmission of cells of a plurality of data streams in a communications network. An earliest deadline first (EDF) scheduler is provided for scheduling the transmission of cells of a plurality of data streams in a communications network to ensure that the connection or data stream with the earliest deadline is transmitted first. Each of the multiple data streams has a delay bound or deadline. Data of each data stream is enqueued to a corresponding data cell queue. A timing wheel time slot based on an identified target transmission time for each data cell queue is calculated utilizing an addition of a maximum delay value. A move forward timing mechanism includes a scan forward feature to identify a succession of virtual connection or data stream cell queues for transmission.

A latest target transmission time for each data cell queue is calculated utilizing predetermined logical channel descriptor parameters. Responsive to each calculated next target transmission time, a time slot in a timing wheel is calculated utilizing an addition of a maximum delay value. An active indication is set for the identified timing wheel time slot and an entry is stored to point to the corresponding data cell queue for the identified timing wheel time slot. A next data cell queue is selected for transmission by checking for the active indication in a current timing wheel time slot. Responsive to identifying the active indication, a first data cell queue is processed for transmission and the data cell queue is rescheduled. Then moving to a next time timing wheel time slot is performed by checking for a next entry from the current timing wheel time slot. Responsive to identifying the next entry, the identified entry is processed from the current timing wheel time slot and return to checking for a next entry from the current timing wheel time slot. Responsive to identifying an empty time slot, a current time value is compared with the current timing wheel time slot. When the current time value is less than or equal to the current timing wheel time slot, a predefined range is scanned, checking for the active indication in any time slot within the predefined range of future times.

A multiple tier cell scheduler is provided that includes at least two scheduling timing wheels. The priority of a first timing wheel is higher than the priority of a second timing wheel. The priority of the second timing wheel is higher than the priority of an optional third timing wheel. The third timing wheel includes a best effort operational mode. The relative rates between data streams are maintained, while the absolute rates of the data streams are increased or decreased in the lowest priority wheel.

BRIEF DESCRIPTION OF THE DRAWINGS

The present invention together with the above and other objects and advantages may best be understood from the following detailed description of the preferred embodiments of the invention illustrated in the drawings, wherein:

FIG. 2 is a block diagram representation illustrating the operation of the cell scheduler of the preferred embodiment of FIG. 1;

FIG. 2A is a chart illustrating a logical channel descriptor (LCD) for a data stream used by the cell scheduler of the preferred embodiment of FIG. 1;

FIG. 2B is a chart illustrating scheduling rate parameters for a constant bit rate, variable bit rate or a leaky bucket rate;

FIG. 9 is a block diagram representation illustrating an alternative three tier timing wheel cell scheduler of the preferred embodiment of FIG. 1.

DETAILED DESCRIPTION OF THE PREFERRED EMBODIMENTS

Figure 1:
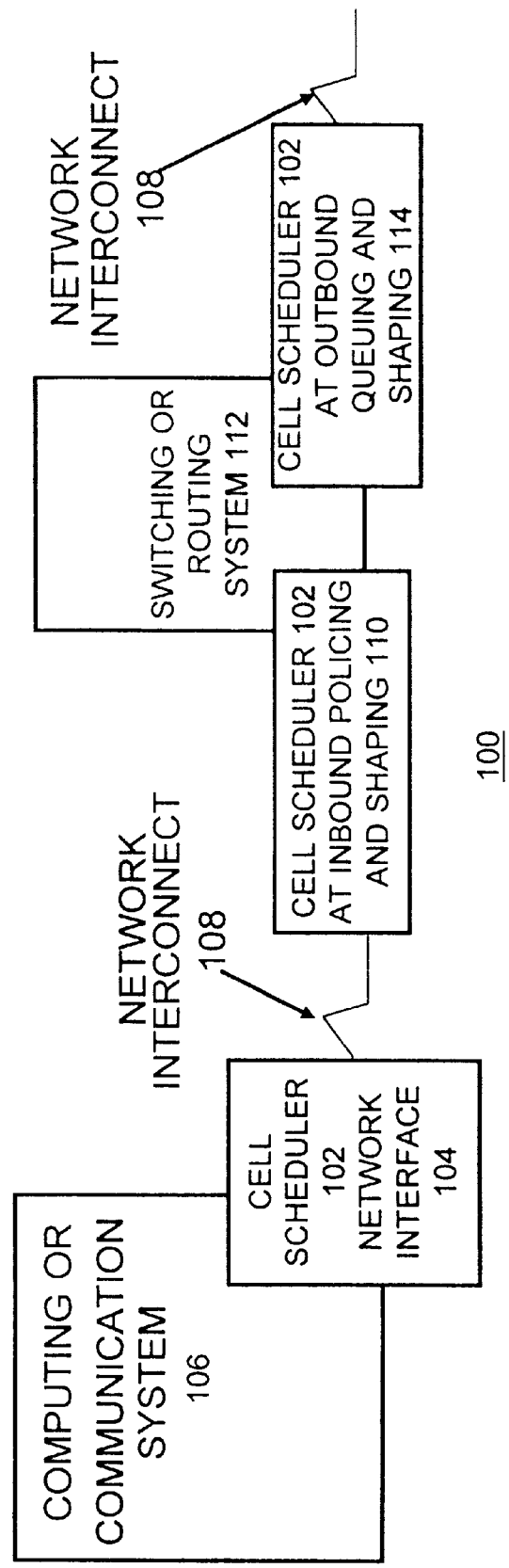
FIG. 1 is a block diagram representation illustrating a communications network system including cell schedulers of the preferred embodiment.

Having reference now to the drawings in FIG. 1, there is shown a communications network 100 including at least one cell scheduler 102 of the preferred embodiment. As shown in FIG. 1, cell scheduler 102 advantageously is used at selected network interconnects 108 at the ingress to or outbound from the network 100. Cell scheduler 102 advantageously is included with a network interface 104 of a computing or communication system 106, at an inbound policing and shaping input 110 of a network internal switching or routing system 112, and/or at an outbound queuing and shaping output 114 of the switch or router 112.

The cell scheduler 102 includes functional operations as a scheduler disclosed in U.S. Pat. No. 5,533,020, entitled ATM CELL SCHEDULER, issued Jul. 2, 1996 to Byrn et al., and assigned to the present assignee. The subject matter of the above-identified patent is incorporated herein by reference.

Cell scheduler 102 includes major and substantial changes which provide advantages over known schedulers. Cell scheduler 102 provides earliest deadline first (EDF) scheduling with reshaping. Reshaping is defined as receiving a data stream with its cells distributed in time and retransmitting the data stream cells with an optionally different time distribution, such that the data stream conforms to a predefined traffic specification, for example, a leaky bucket specification.

In accordance with features of the preferred embodiment, cell scheduler 102 provide an earliest deadline first (EDF) scheduling policy that combines logical traffic reshaping and deadline based scheduling. In the logical traffic reshaping performed by the cell scheduler 102, the eligibility time of a cell or packet is determined based upon the leaky bucket state, without necessarily enforcing that the packet be held back until it becomes eligible. The eligibility time of the packet is only used to arbitrate between packets, when there are several packets from different flows contending for transmission. It should be understood that this logical traffic reshaping and deadline based scheduling policy of the preferred embodiment does not ensure that the flow of packets being transmitted conforms to its traffic contract. For example, a stream flow can exceed its traffic contract, in the absence of other competing traffic flows currently on the network link 100. This may not be a suitable approach when connecting to entities that require strict compliance with a traffic contract, e.g., an ATM service provider. However, in the context of an internal network connection, this is perfectly adequate on trunks between network nodes. Furthermore, the reshaping by cell scheduler 102 that is performed when needed at the input of each network node, ensures that deviations from the traffic contract remain limited.

In order to combine traffic contract enforcement and the scheduling of cell transmissions, both the eligibility time of the next cell and the delay bound or deadline assigned to its connection are used, i.e., added, to determine the maximum time at which the next cell needs to be transmitted. This is best explained in the context of an example as follows, where two connections 1 and 2, have a token bucket size of 5 cells. In the following example, connection 1 has a token generation rate of one every 5 slots and a delay requirement of 3 slots. Connection 2 has a token generation rate of one every 10 slots and a delay requirement of 6 slots.

Assume connection 1 and connection 2 have the following arrival patterns starting at slot 1:

connection 1: 0,0,0,0,0,0,0,5,0,0,1,0,0,0, . . .

connection 2: 5,5,0,0,0,0,0,0,0,0,0,1,0, . . .

cell eligibility times out of the leaky buckets for each connection are as then follows:

connection 1: 8,9,10,11,12,13 . . .

connection 2: 1,2, 3, 4, 5,10,20,30,40,50,60 . . .

Based on the above eligibility times and the fact that connection 1 has a delay bound of 3 slots and connection 2 has a delay bound of 6 slots, we compute the following deadlines for the cells of the two connections:

Connection 1:

arrival times: 8,8, 8, 8, 8,11, . . .

eligibility times: 8,9,10,11,12,13, . . .

deadlines: 11,12,13,14,15,16, . . .

Connection 2:

arrival times: 1,1,1, 1, 1, 2, 2, 2, 2, 2,13, . . .

eligibility times: 1,2,3, 4, 5,10,20,30,40,50,60, . . .

deadlines: 7,8,9,10,11,16,26,36,46,56,66, . . .

This will then result in the following sequence of cell transmissions when using the EDF policy based on deadline equal to the sum of the eligibility time of a cell and its delay bound:

Connection: 2,2,2, 2, 2, 2, 2, 1, 1, 1, 1, 1, 1, . . .

arrival times: 1,1,1, 1, 1, 2, 2, 8, 8, 8, 8, 8,11, . . .

deadlines: 7,8,9,10,11,16,26,11,12,13,14,15,16, . . .

transmission time: 1,2,3, 4, 5, 6, 7, 8, 9,10,11,12,14, . . .

eligibility time: 1,2,3, 4, 5,10,20, 8, 9,10,11,12,13, . . .

The above example shows that while packets from connection 2 are transmitted before their eligibility time, this did not impact connection 1. The result is provided because packets are scheduled so that their deadline are never violated and each flow is reshaped logically instead of physically.

Having reference to FIG. 2, the cell scheduler 102 is fed by a data enqueue mechanism 202 providing transmission/processing queues 204 with each queue including a logical channel descriptor (LCD) 206 or other such type of logical connection control block. The data enqueue mechanism 202 may be receive logic from the network 100, a stored program processor, or a combination of both of these mechanisms. Cell scheduler 102 uses the set of logical channel descriptors LCDs 206 that hold the data for each scheduled data entity. This may include a queue of data descriptors and configuration information for the transmission preparation logic. The scheduling selection logic of cell scheduler 102 selects a succession of LCDs and passes this selected succession to the transmission preparation logic 208. The transmission preparation logic 208 takes the LCD data structure selected by the scheduling selection logic 102 and prepares a transmission.

Referring to FIG. 2A, there is shown a chart illustrating the logical channel descriptor (LCD) 206 for a data stream used by cell scheduler 102. The LCD 206 is a data structure which describes a data stream cell queue. LCD 206 includes a next LCD pointer 209 for linking LCDs together at a timing wheel time slot. LCD 206 includes pointers to a chain of cells and/or packets to be transmitted including a head of cell/packet queue pointer 210 and a tail of cell/packet queue pointer 212. LCD 206 also includes scheduling information for the corresponding data stream shown as scheduling parameters 214, a scheduling state 216 and a timing wheel selector 218. The LCD also maintains a timestamp for the connection.

Referring to FIG. 2B, there is shown a chart listing multiple scheduling rate parameters 220 including a peak transmission rate 222, a sustainable transmission rate 224, a peak burst length 226, a constant bit rate/variable bit rate CBR/VBR traffic type 228, and a max delay 230. These scheduling rate parameters 220 are specified for a constant bit rate, variable bit rate or a leaky bucket rate connection. These rates 222 and 224 are converted into intervals in terms of a number of fast timing wheel slots and fractions. The burst length is maintained as the maximum difference between the connection time stamp and the current time.

Figure 3:
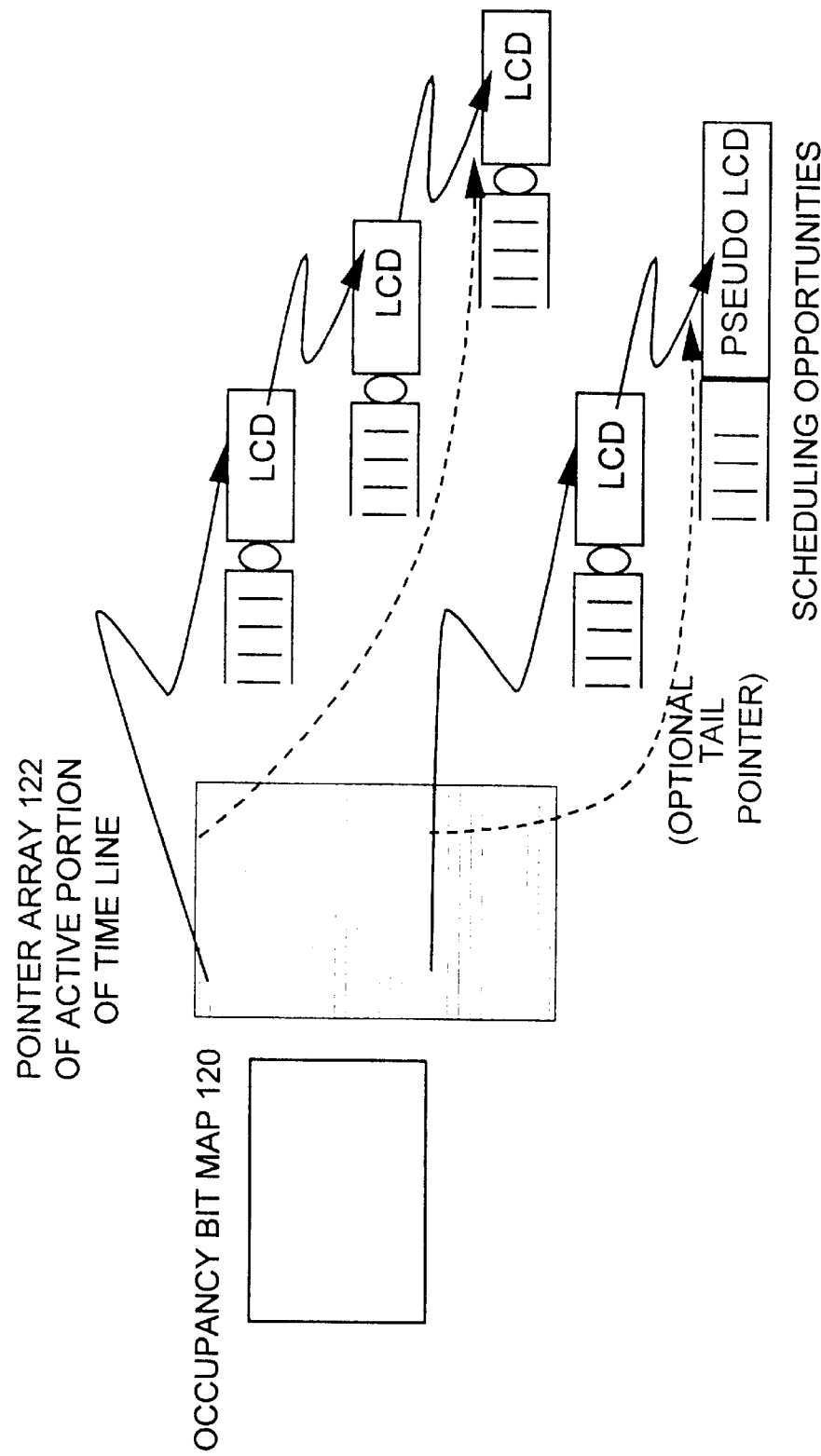
FIG. 3 is a schematic and block diagram representation illustrating data structures including a timing wheel of the cell scheduler of the preferred embodiment of FIG. 1.
Figure 4:
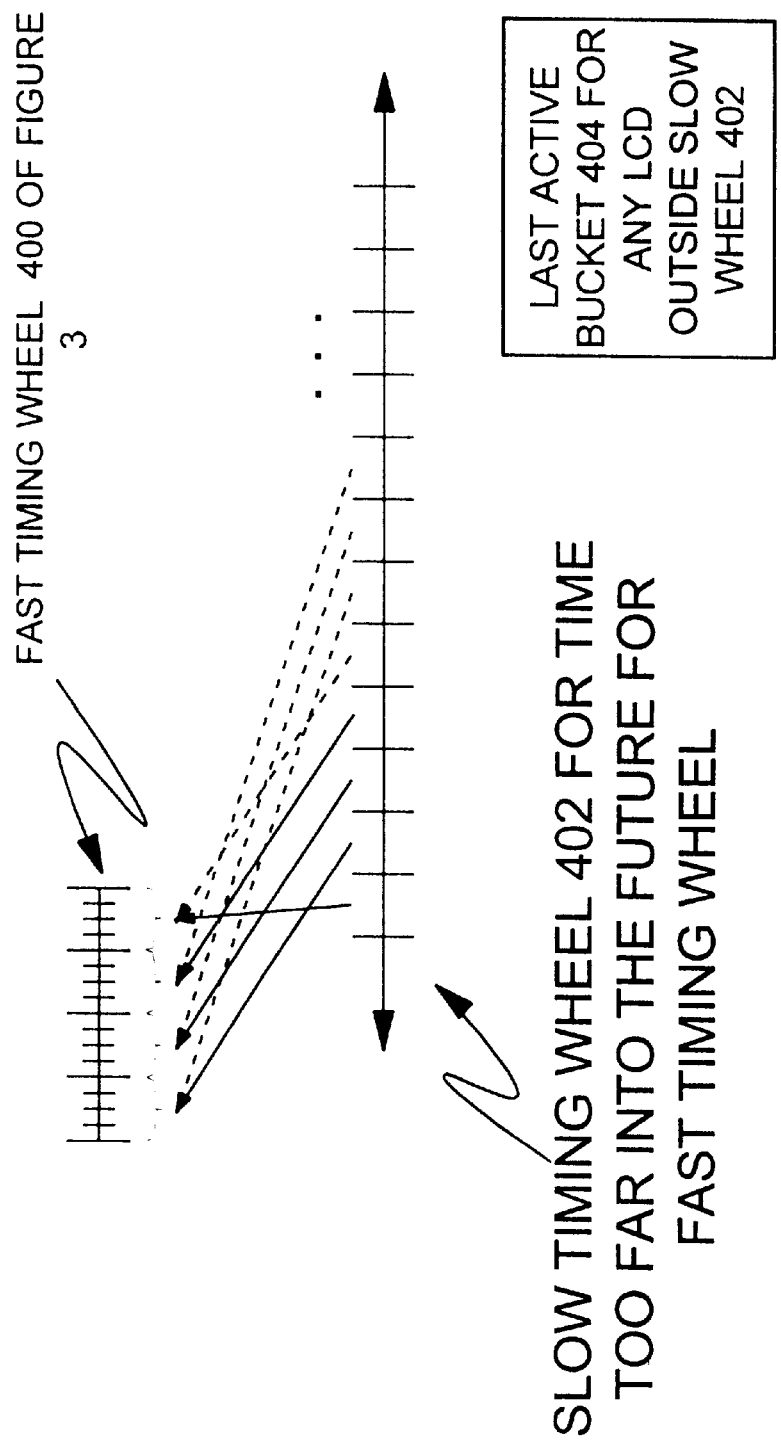
FIG. 4 is a schematic and block diagram representation illustrating fast and show timing wheels and a last active bucket of the cell scheduler of the preferred embodiment of FIG. 1.

Referring to FIG. 3, the cell scheduler 102 is made up of data structures including at least one timing wheel, such as timing wheels 400, 402 illustrated in FIG. 4. As shown in FIG. 3, the data structures include a timing wheel comprising an array 122 of pointers to LCDs and an optional occupancy bit map 120 of the timing wheel, comprising a bit for each storage location in the timing wheel. Each bit indicates whether the timing wheel slot contains a valid pointer. This bit is used to control the need for reading memory locations and is used to support a fast scan forward. This bit array may be able to be read more than 1 bit at a time. Reading this bit array returns a frame of bits which can be evaluuvated as a group. Additionally, the LCD contains a pointer that can be used to point to the next LCD stored in the same slot in the timing wheel. This pointer is used to create a chain of LCDs for each active time slot. Optionally the timing wheel can contain a set of pointers that point to the last entry in the chain of LCDs. This second pointer can be used for fast insertion to the end of the chain of LCDs. While not a required element, this second pointer is included in the preferred embodiment.

Having reference to FIG. 4, a fast timing wheel 400 and a slow timing wheel 402 optionally are used. Each slot in each timing wheel corresponds to a range of time, with the fast timing wheel 400 used for smaller ranges of time, and the slow timing wheel 402 used for larger ranges of time. FIG. 4 illustrates connections between these timing wheels 400 and 402, together with a last active bucket 404 that is used for any LCDs with intervals greater than the slow timing wheel 402.

Cell scheduler 102 keeps track of the current time of the system by a global variable, curr_slot which equals the current time in slots. For each LCD connection (i) the constants that are maintained include a mean interval in slots, mean int(i); a product of the mean interval, and the burst size in slots, bmproduct(i); the minimum cell intertransmission time in slots, peak int(i); and the delay guarantee or deadline in slots for the connection (i), max_delay (i). Dynamic connection variables that are maintained include the state of the leaky bucket, state(i), which is the greater of state(i) and the sum of the mean_int(i) and {curr_slot—bmproduct(i)}; and the slot in the timing wheel where the cell from connection (i) is placed, qslot(i). The state of the leaky bucket, state(i) is further defined in the following. Note that bmproduct(i) acts as a limit to the temporal memory of the scheduling state.

A basic scheduling algorithm of cell scheduler 102 scans forward in the timing wheel 400 with a limited lookahead, L, from the current time curr_slot. If it finds a first connection, say connection (i) with an LCD enqueued on the timing wheel (TW) within that range, i.e., (qslot(i)—curr_slot)<L, then cell scheduler 102: a) sends out this cell; b) increments the curr_slot; and c) computes the next time that this LCD has to be enqueued on the timing wheel 400 or 402.

At initialization, scheduling algorithm of cell scheduler 102 sets the curr_slot=0; and state(i)=curr_slot+mean_int (i)-bmproduct(i).

Two conditions 1) and 2) to be considered for deciding where scheduling algorithm will enqueue an LCD on the timing wheel are now described.

1) A Packet from connection (i) is Enqueued for Transmit to the scheduling algorithm 1a) If LCD is already on the Timing wheel, then:
   Add packet to the LCD queue.
   1b) If LCD is not on the timing wheel, then:
   state(i)=max{state(i), curr_slot+mean_int(i)-bmproduct(i)}
   qslot(i)=max{state(i), curr_slot}+max_delay(i)
   Enqueue the LCD on the TW at qslot(i)

2) The LCD for connection (i) is on the slot that has just been selected for transmission by the scheduling algorithm of cell scheduler 102, then:

2a) If there are no packets queued on this LCD, then:
   Remove LCD from Timing wheel (transmit nothing).
   2b) If there are more cells to be transmitted, then set:
   state(i)=mean_inti)+state(i)
   qslot(i)=max{state(i)+max_delay(i), qslot(i)}
   Enqueue the LCD on the TW at qslot(i)

It is assumed that the above operation 2)a), does not waste a slot; in other words that some valid cell, if it exists, can be sent out in that slot. If this is not the case, then we have to account for this loss of a slot, primarily a call admission issue. The lookahead of L does not waste a slot. This lookahead of L typically is large enough to cover the largest value of max_delay(i) or covers a reasonable range of max_delays for a given node.

Figure 5:
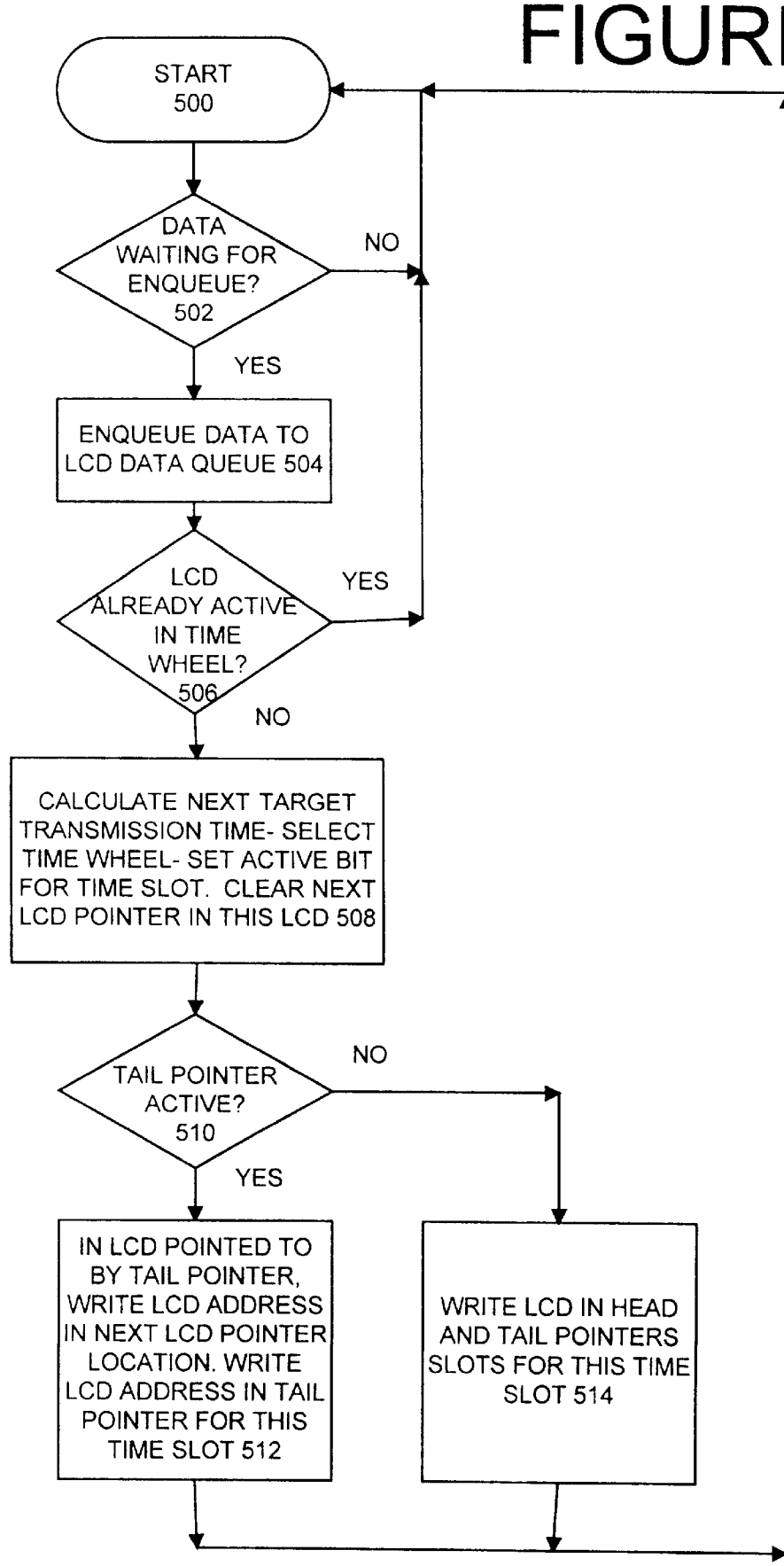
FIG. 5 is a flow chart illustrating sequential operations of the cell scheduler of the preferred embodiment of FIG. 1 to enqueue cells.

Referring to FIG. 5, the general process used by the cell scheduler 102 to enqueue is illustrated including exemplary steps starting at a block 500. Checking for data waiting to be enqueued is performed as indicated at a decision block 502. If so, then the data waiting is enqueued to an LCD data queue as indicated at block 504. More than one LCD data queue can be provided for each logical connection. Next, checking for an LCD already active in the timing wheel 400 is provided as indicated at a decision block 506. If so, then the sequential operations return to the beginning at block 500. If the LCD is not already active in the timing wheel 400, then as indicated at block 508 the next steps include to calculate a next target transmission time, select a timing wheel 400 or 402, set an active bit for a time slot, and clear the next LCD pointer in this LCD. Next checking for an active tail pointer is provided as indicated at a decision block 510. For an active tail pointer, in the LCD pointed to by the tail pointer, the LCD address is written in the next LCD pointer location and the LCD address is written in the tail pointer for this time slot as indicated at a block 512. Otherwise, the LCD is written in the head and tail pointer slots for this time slot as indicated at a block 514. Then the sequential operations return to the beginning at block 500.

Figure 6:
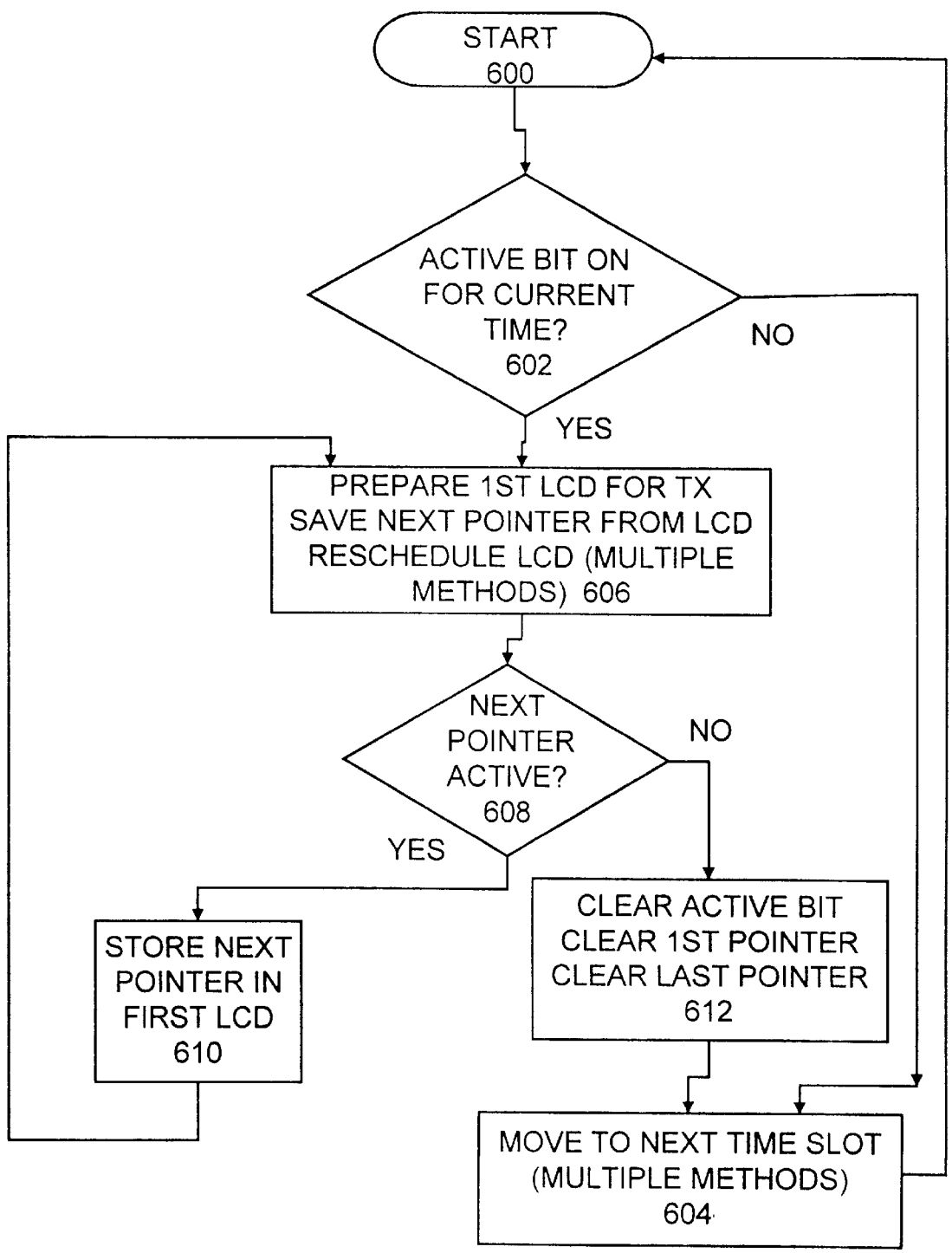
FIG. 6 is a flow chart illustrating sequential operations of the cell scheduler of the preferred embodiment of FIG. 1 to determine a next logical channel descriptor (LCD) to pass to transmission preparation logic.

Referring to FIG. 6, the general process used by the cell scheduler 102 to determine the next LCD to pass to the transmission preparation logic 208 is illustrated. As shown in FIG. 6, there are several possible mechanisms for calculating the next transmission time slot that an LCD should be moved to, and there are several mechanisms that may be used to calculate the move to the next time. Starting at a block 600, checking for an active bit on for the current time is performed as indicated at a decision block 602. When an active bit on for the current time is not identified, then a move to a next time slot is provided using one of multiple possible methods as indicated at a block 604. Then the sequential operation return to the beginning at block 600. Otherwise, when an active bit on for the current time is identified, then the first LCD is prepared for transmission (TX), a next pointer from the LCD is saved and the LCD is rescheduled using one of multiple possible methods as indicated at a block 606. Checking for a next pointer being active is provided as indicated at a decision block 608. If yes, then the next pointer is stored in the first LCD as indicated at a block 610. Then the sequential operations return to block 606 to prepare the first LCD for transmission. Otherwise, when the next pointer is not active; then the active bit is cleared, the first pointer is cleared and the last pointer is cleared as indicated at a block 612. Then a move to a next time slot is performed at block 604. Then the sequential operation return to the beginning at block 600.

Figure 7:
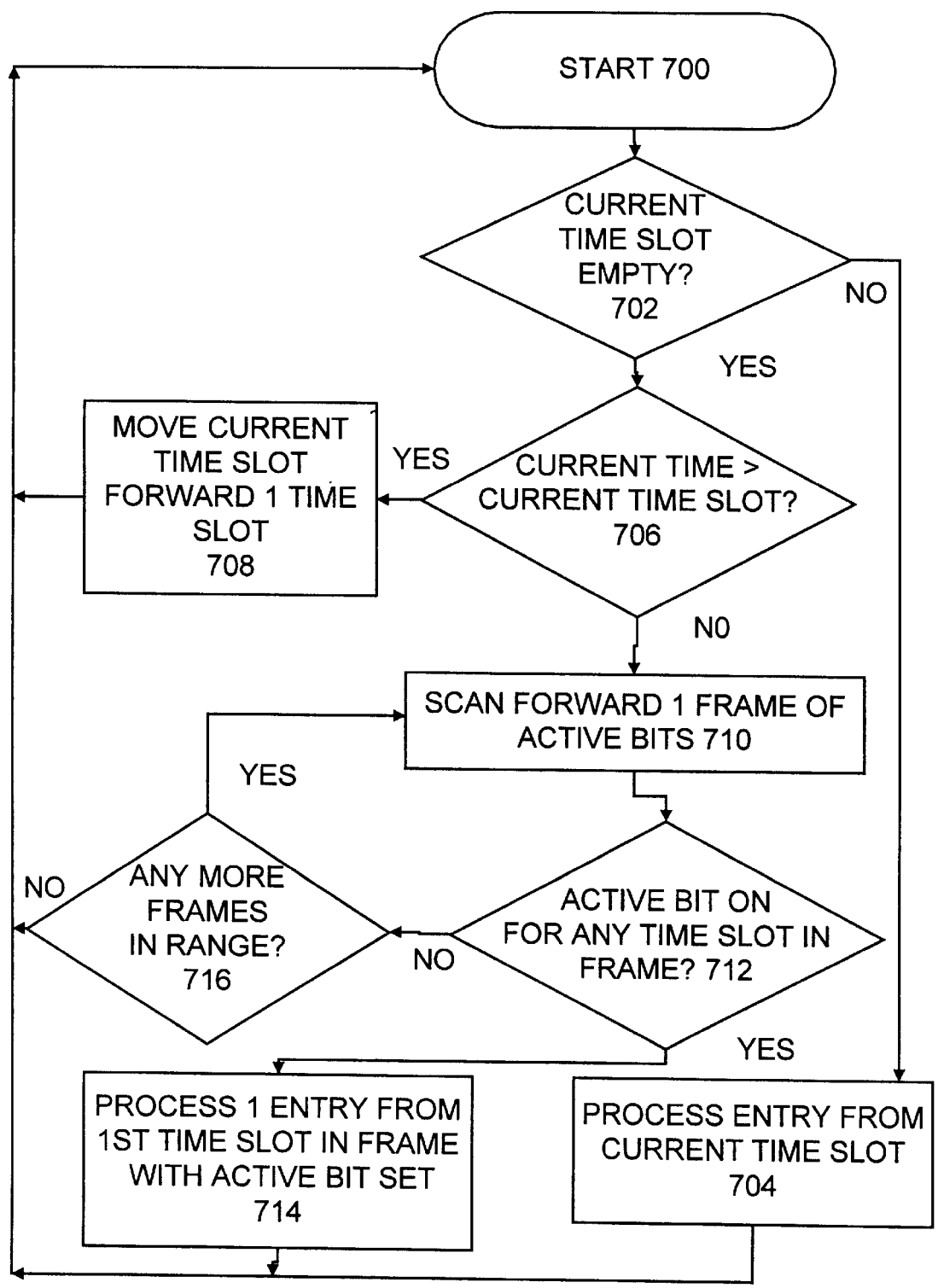
FIG. 7 is a flow chart illustrating sequential operations of the cell scheduler of the preferred embodiment of FIG. 1 to determine a move to a next time slot.

Referring to FIG. 7, exemplary steps for the move to the next time are shown. The sequential steps begin at a block 700. Checking for an empty current time slot is performed as indicated at a decision block 702. If the current time slot is not empty, then the entry from the current time slot is processed as indicated at a block 704. Then the sequential operation return to the start at block 700. When the current time slot is empty, then the current time is compared with the current time slot as indicated at a decision block 706. If the current time is greater than the current time slot, then the current time slot is moved forward one time slot as indicated at a block 708. If the current time is less than or equal to the current time slot, then scanning forward one frame of active bits is performed as indicated at a block 710. Checking for an active bit on for any time slot in the frame is performed as indicated at a decision block 712. When an active bit on for any time slot in the frame is identified at block 712, then one entry form the first time slot in the frame with the active bit set is processed as indicated at a block 714 and the sequential operation return to the start at block 700. When an active bit on for any time slot in the frame is not identified at block 712, then checking for any more frames in the range L is performed as indicated at a decision block 716. When another frame in the range is identified, then the sequential operation return to block 710 for scanning forward one frame of active bits. When another frame in the range is not identified, then the sequential operation return to the start at block 700.

Figures 7A, 8:
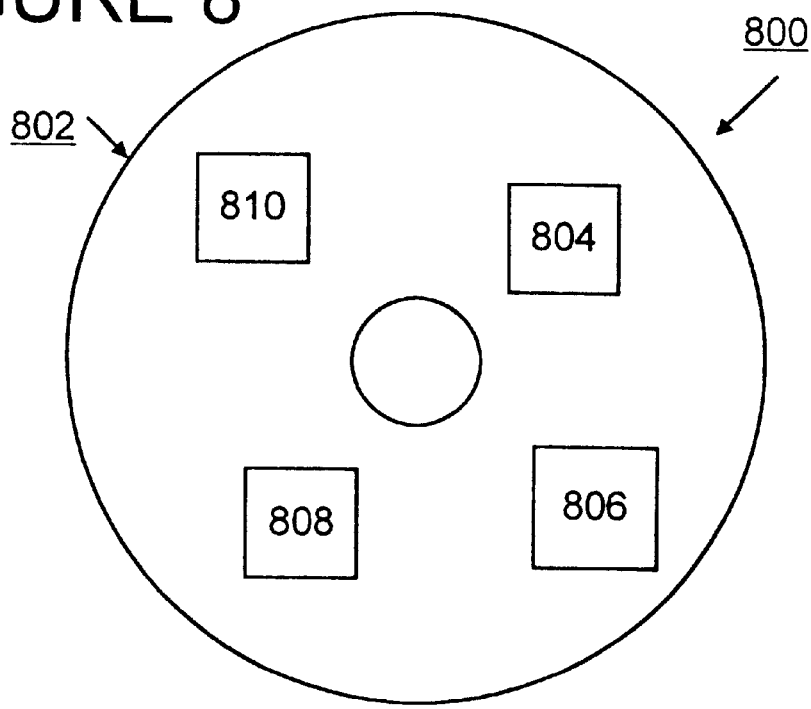
FIG. 7A is a flow chart illustrating calculation of a next timestamp and a next time slot by the cell scheduler of the preferred embodiment of FIG. 1.
FIG. 8 is a block diagram illustrating a computer program product in accordance with the preferred embodiment.

FIG. 7A illustrates calculation of a new timestamp and a new time slot by the cell scheduler 102. A new timestamp is calculated as indicated at a block 720 utilizing the following equation:

New timestamp=MAX(old timestamp+sustained interval, current time−burst limit).

A new time slot is calculated as indicated at a block 722 utilizing the following equation:

New time slot=MAX(timestamp+sustained interval, current time+peak interval)+max delay, where peak interval is the minimum cell inter-arrival time in slots. The move forward method of FIG. 7 and the new timestamp and new time slot calculation algorithms of FIG. 7A provide the effect of maintaining a list of LCDs into the future that is sorted by deadline, resulting from the addition of the deadline term in the new time slot term. Cells from the connection with the earliest deadline are transmitted first. When the transmission resource, network 100 is not over subscribed, the each cell of multiple data streams will be transmitted before its deadline.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the cell scheduling methods of this invention in the communications system 100 of FIG. 1.

A sequence of program instructions or a logical assembly of one or more interrelated modules defined by the recorded program means 804, 806, 808, 810, direct the cell scheduler 102 for scheduling the transmission of cells and frames in communications network 100.

Figure 10:
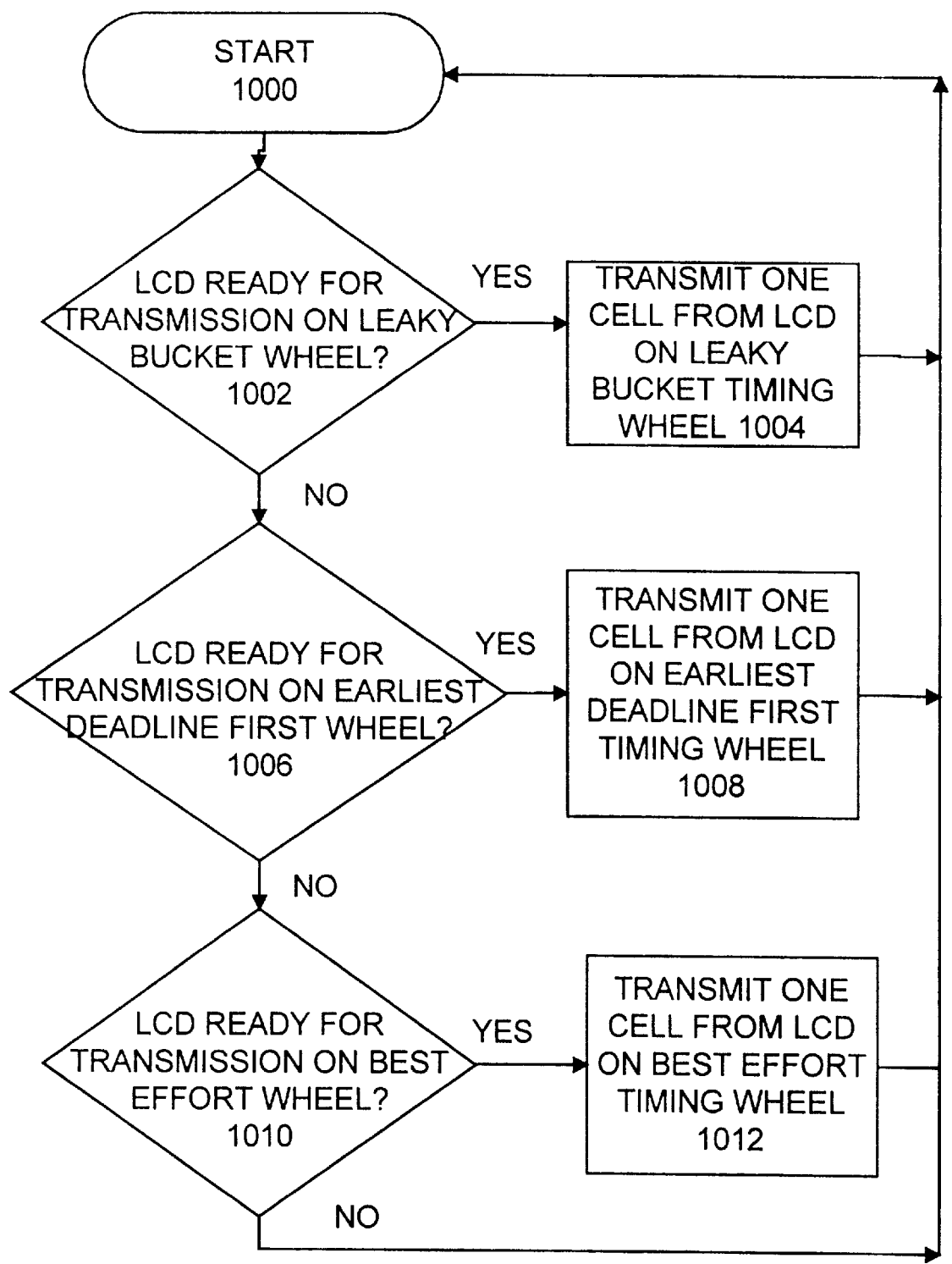
FIG. 10 is a flow chart illustrating exemplary operations of the three tier timing wheel cell scheduler of FIG. 9.

FIG. 9 is a block diagram representation illustrating an alternative three tier timing wheel cell scheduler 102. The three tier timing wheel cell scheduler 102 includes a leaky bucket timing wheel 902 having a highest priority, an earliest deadline first timing wheel 904 having a middle priority and a best effort timing wheel 906 having a lowest priority. Three tier cell scheduler 102, a new time slot is calculated for the best effort timing wheel 906 that does not include the addition of the max delay 230, as shown in the following equation:

New time slot=MAX(timestamp+sustained interval, current time+peak interval),

FIG. 10 illustrates exemplary operations of the three tier timing wheel cell scheduler 102 starting at a block 1000. First checking whether a LCD is ready for transmission on the highest priority leaky bucket wheel is performed as indicated at a decision block 1002. If a LCD is ready for transmission on the highest priority leaky bucket wheel 902, then one cell is transmitted from the LCD on the leaky bucket timing wheel as indicated at a block 1004. Then the sequential operations return to the beginning at block 1000.

When a LCD is not ready for transmission on the highest priority leaky bucket wheel 902, then checking whether a LCD is ready for transmission on the middle priority earliest deadline first wheel 904 is performed as indicated at a decision block 1006. If a LCD is ready for transmission on the middle priority earliest deadline first timing wheel 904, then one cell is transmitted from the LCD on the earliest deadline first timing wheel 904 as indicated at a block 1008. Then the sequential operations return to the beginning at block 1000.

When a LCD is not ready for transmission on the middle priority earliest deadline first timing wheel 904, then checking whether a LCD is ready for transmission on the lowest priority best effort timing wheel 906 is performed as indicated at a decision block 1010. If a LCD is ready for transmission on the lowest priority best effort timing wheel 906, then one cell is transmitted from the LCD on the lowest priority best effort timing wheel 906 as indicated at a block 1012. When a LCD is not ready for transmission on the lowest priority best effort timing wheel 906 or after the cell is transmitted at block 1012, then the sequential operations return to the beginning at block 1000.

While the present invention has been described with reference to the details of the embodiments of the invention shown in the drawing, these details are not intended to limit the scope of the invention as claimed in the appended claims.

We claim:

1. A method for scheduling the transmission of cells of a plurality of data streams in a communications network comprising the steps of:

enqueuing data of each data stream to a corresponding data cell queue;

calculating a target transmission time for each said data cell queue utilizing predetermined logical scheduling rate parameters of each data stream;

responsive to each said calculated next target transmission time, calculating a time slot in a timing wheel utilizing an addition of a maximum delay value, setting an active indication for said identified timing wheel time slot and storing an entry to point to said corresponding data cell queue for said identified timing wheel time slot;

selecting a next data cell queue for transmission by checking for said active indication in a current timing wheel time slot;

responsive to identifying said active indication, processing a first data cell queue for transmission and rescheduling said data cell queue;

moving to a next time timing wheel time slot by checking for an entry from said current timing wheel time slot;

responsive to identifying said entry, processing said identified entry from said current timing wheel time slot and returning to checking for a next entry from said current timing wheel time slot;

responsive to identifying an empty time slot, comparing a current time value with said current timing wheel time slot, responsive to a current time value less than or equal to said current timing wheel time slot, scanning forward a predefined range, checking for said active indication in any time slot within said predefined range.

2. A method for scheduling the transmission of cells of a plurality of data streams in a communications network as recited in claim 1 includes the steps of processing a first identified entry from a first timing wheel time slot in said range and returning to checking for a next entry from said current timing wheel time slot.

3. A method for scheduling the transmission of cells of a plurality of data streams in a communications network as recited in claim 1 includes the steps of responsive to identifying said current time value greater than said current timing wheel slot, moving to a next timing wheel time slot and returning to checking for said active indication for said current time slot.

4. A method for scheduling the transmission of cells of a plurality of data streams in a communications network as recited in claim 1 wherein the step of calculating said target transmission time for each said data cell queue utilizing predetermined logical scheduling rate parameters of each data stream includes the steps of maintaining peak transmission rate and sustainable transmission rate connection parameters in terms of timing wheel time slot intervals and utilizing a calculation algorithm represented by: New timestamp=MAX(old timestamp+sustained interval, current time−burst limit).

5. A method for scheduling the transmission of cells of a plurality of data streams in a communications network as recited in claim 4 wherein the step of calculating said time slot in said timing wheel utilizing an addition of a maximum delay value includes utilizing a calculation algorithm represented by: New time slot=MAX(timestamp+sustained interval, current time+peak interval)+max delay.

6. A method for scheduling the transmission of cells of a plurality of data streams in a communications network as recited in claim 1 wherein said step of enqueuing data of each data stream to said corresponding data cell queue includes the steps of enqueuing data of each said data stream to at least one logical channel descriptor for each said data stream.

7. A method for scheduling the transmission of cells of a plurality of data streams in a communications network as recited in claim 6 wherein said steps of calculating said target transmission time and calculating said time slot in a timing slot are performed for each logical channel descriptor for each said data stream.

8. Apparatus for scheduling the transmission of cells of a plurality of data streams in a communications network comprising:

memory means for storing a corresponding data cell queue enqueued data of each data stream;

means for calculating a target transmission time for each said data cell queue utilizing predetermined logical scheduling rate parameters of each data stream;

means responsive to said next target transmission time calculating means, for calculating a time slot in a timing wheel utilizing an addition of a maximum delay value, means for storing an active indication for said identified timing wheel time slot and means for storing an entry to point to said corresponding data cell queue for said identified timing wheel time slot;

means for selecting a next data cell queue for transmission including means for checking for said active indication in a current timing wheel time slot;

means, responsive to identifying said active indication, for processing a first data cell queue for transmission and for rescheduling said data cell queue;

means for moving to a next time timing wheel time slot including means for checking for an entry from said current timing wheel time slot;

means, responsive to said entry checking means, for processing an identified entry from said current timing wheel time slot and for checking for a next entry from said current timing wheel time slot;

means, responsive to an empty time slot identified by said entry checking means, for comparing a current time value with said current timing wheel time slot, means, responsive to an identified current time value less than or equal to said current timing wheel time slot, for scanning forward a predefined range, checking for said active indication in any time slot within said predefined range.

9. Apparatus for scheduling the transmission of cells of a plurality of data streams in a communications network as recited in claim 8 further includes means for processing a first identified entry from a first timing wheel time slot in said range and for checking for a next entry from said current timing wheel time slot.

10. Apparatus for scheduling the transmission of cells of a plurality of data streams in a communications network as recited in claim 8 further includes means, responsive to identifying said current time value greater than said current timing wheel slot, for moving to a next timing wheel time slot and for checking for said active indication for said current time slot.

11. Apparatus for scheduling the transmission of cells of a plurality of data streams in a communications network as recited in claim 8 further includes a last active bucket responsive to a calculated next target transmission time beyond said timing wheel time slots.

12. An earliest deadline first (EDF) scheduler for scheduling the transmission of cells of a plurality of data streams in a communications network comprising:

memory means for storing a corresponding data cell queue for each of the plurality of data streams;

means for storing predetermined logical channel control parameter values for each data cell queue, said predetermined logical channel control parameter values including has a delay bound value;

timing wheel means for storing an array of pointers to said data cell queues and for storing an occupancy bit map of timing wheel time slots;

means for calculating a target transmission time and for calculating a timing wheel time slot for each data cell queue, said timing wheel time slot calculating means utilizing an addition of said delay bound value; and timing means for moving forward on said timing wheel time slots to identify a succession of data stream cell queues for transmission, said timing means including means for checking for an entry from said current timing wheel time slot; means, responsive to said entry checking means, for processing an identified entry from said current timing wheel time slot and for checking for a next entry from said current timing wheel time slot; means, responsive to an empty time slot identified by said entry checking means, for comparing a current time value with said current timing wheel time slot, and means, responsive to an identified current time value less than or equal to said current timing wheel time slot, for scanning forward a predefined range, and for checking for said active indication in any time slot within said predefined range.

13. An earliest deadline first (EDF) scheduler for scheduling the transmission of cells and frames of a plurality of data streams in a communications network as recited in claim 12 wherein said timing means further includes means for processing a first identified entry from a first timing wheel time slot in said range and for checking for a next entry from said current timing wheel time slot.

14. An earliest deadline first (EDF) scheduler for scheduling the transmission of cells of a plurality of data streams in a communications network as recited in claim 12 wherein said timing means further includes means, responsive to identifying said current time value greater than said current timing wheel slot, for moving to a next timing wheel time slot and for checking for said active indication for said current time slot.

15. An earliest deadline first (EDF) scheduler for scheduling the transmission of cells of a plurality of data streams in a communications network as recited in claim 12 further includes a last active bucket responsive to a calculated next target transmission time beyond said timing wheel time slots.

16. A communications network comprising:
- at least one communication system including a network interface;
- a cell scheduler included with said network interface; said cell scheduler including memory means for storing a corresponding data cell queue of enqueued data of each data stream;
- means for calculating a target transmission time for each said data cell queue utilizing predetermined logical scheduling rate parameters of each data stream;
- means responsive to said next target transmission time calculating means, for calculating a time slot in a timing wheel utilizing an addition of a maximum delay value, means for storing an active indication for said identified timing wheel time slot and means for storing an entry to point to said corresponding data cell queue for said identified timing wheel time slot;
- means for selecting a next data cell queue for transmission including means for checking for said active indication in a current timing wheel time slot;
- means, responsive to identifying said active indication, for processing a first data cell queue for transmission and for rescheduling said data cell queue;
- means for moving to a next time timing wheel time slot including means for checking for an entry from said current timing wheel time slot;
- means, responsive to said entry checking means, for processing an identified entry from said current timing wheel time slot and for checking for a next entry from said current timing wheel time slot;
- means, responsive to an empty time slot identified by said entry checking means, for comparing a current time value with said current timing wheel time slot,
- means, responsive to an identified current time value less than or equal to said current timing wheel time slot, for scanning forward a predefined range, checking for said active indication in any time slot within said predefined range.

17. A communications network as recited in claim 16 further including an internal network routing system including at least one said cell scheduler.

18. A computer program product for use in a data communications network having a cell scheduler for scheduling the transmission of cells of a plurality of data streams in said communications network, the computer program product comprising:
- a record medium;
- means, recorded on said recording medium, for storing a corresponding data cell queue for each of the plurality of data streams;
- means, recorded on said recording medium, for storing predetermined logical channel control parameter values for each data cell queue, said predetermined logical channel control parameter values including has a delay bound value;
- timing wheel means, recorded on said recording medium, for storing an array of pointers to said data cell queues and for storing an occupancy bit map of timing wheel time slots;
- means, recorded on said recording medium, for calculating a target transmission time and for calculating a timing wheel time slot for each data cell queue, said timing wheel time slot calculating means utilizing an addition of said delay bound value; and
- timing means, recorded on said recording medium, for moving forward on said timing wheel time slots identify a succession of data stream cell queues for transmission,
- said timing means including means for checking for an entry from said current timing wheel time slot; means, responsive to said entry checking means, for processing an identified entry from said current timing wheel time slot and for checking for a next entry from said current timing wheel time slot; means, responsive to an empty time slot identified by said entry checking means, for comparing a current time value with said current timing wheel time slot, and
- means, responsive to an identified current time value less than or equal to said current timing wheel time slot, for scanning forward a predefined range, and for checking for said active indication in any time slot within said predefined range.

19. A multiple tier cell scheduler for scheduling the transmission of cells of a plurality of data streams in a communications network comprising:
- memory means for storing a corresponding data cell queue for each of the plurality of data streams;
- means for storing predetermined logical channel control parameter values for each data cell queue,
- means for calculating a target transmission time for each said data cell queue utilizing predetermined logical scheduling rate parameters of each data stream;
- means responsive to each said calculated next target transmission time, for selecting a higher priority timing wheel, or a lower priority timing wheel, means for calculating a timing wheel time slot in said selected timing wheel, means for setting an active indication for said identified timing wheel time slot and means for storing an entry to point to said corresponding data cell queue for said identified timing wheel time slot;
- means for selecting a next data cell queue for transmission including means for identifying scheduling opportunities on said timing wheel and means, responsive to identified scheduling opportunities, for moving entries from said lower priority timing wheel to said higher priority timing wheel.

20. A multiple tier cell scheduler for scheduling the transmission of cells of a plurality of data streams in a communications network as recited in claim 19 wherein said higher priority timing wheel includes a higher priority leaky bucket timing wheel and wherein said lower priority timing wheel includes a lower priority earliest deadline first timing wheel.

21. A multiple tier cell scheduler for scheduling the transmission of cells of a plurality of data streams in a communications network as recited in claim 19 wherein said higher priority timing wheel includes a higher priority earliest deadline first timing wheel and wherein said lower priority timing wheel includes a lower priority best effort timing wheel.

22. A multiple tier cell scheduler for scheduling the transmission of cells of a plurality of data streams in a communications network as recited in claim 19 wherein said higher priority timing wheel includes a higher priority leaky bucket timing wheel and wherein said lower priority timing wheel includes a lower priority best effort timing wheel.

23. A multiple tier cell scheduler for scheduling the transmission of cells of a plurality of data streams in a communications network as recited in claim 19 further include a middle priority timing wheel.

24. A multiple tier cell scheduler for scheduling the transmission of cells of a plurality of data streams in a communications network as recited in claim 23 wherein said higher priority timing wheel includes a higher priority leaky bucket timing wheel, said middle priority timing wheel includes a earliest deadline first middle priority timing wheel, and said lower priority timing wheel includes a lower priority best effort timing wheel.

25. A multiple tier cell scheduler for scheduling the transmission of cells of a plurality of data streams in a communications network as recited in claim 24 further include means for defining scheduling opportunities on at least one of said higher priority leaky bucket timing wheel and said middle priority earliest deadline first timing wheel utilizing a predefined pseudo data cell queue; and wherein said means for calculating said target transmission time for each said data cell queue utilizing predetermined logical scheduling rate parameters of each data stream includes said predefined pseudo data cell queue, and said identified target transmission time for said predefined pseudo data cell queue defining scheduling opportunities of multiple lower priority best effort timing wheel time slots.

26. A multiple tier cell scheduler for scheduling the transmission of cells of a plurality of data streams in a communications network as recited in claim 24 wherein said means for selecting a next data cell queue for transmission includes means for checking for said active indication in a current timing wheel time slot of said higher priority leaky bucket timing wheel; means, responsive to an absence of said active indication in said current frame, for reading a next frame and means for moving an entry from said lower priority best effort timing wheel to at least one of said higher priority leaky bucket timing wheel and said middle priority earliest deadline first timing wheel.

* * * * *